US008407094B1

(12) United States Patent
Axe et al.

(10) Patent No.: US 8,407,094 B1
(45) Date of Patent: Mar. 26, 2013

(54) PROVIDING LINKS TO RELATED ADVERTISEMENTS

(75) Inventors: Brian Axe, San Francisco, CA (US); Jerry Felker, West Hills, CA (US); Ross Koningstein, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 3052 days.

(21) Appl. No.: 10/814,101

(22) Filed: Mar. 31, 2004

(51) Int. Cl.
*G06Q 30/00* (2012.01)

(52) U.S. Cl. .................................................. 705/14.73

(58) Field of Classification Search ............... 705/14
See application file for complete search history.

(56) References Cited

U.S. PATENT DOCUMENTS

| | | | |
|---|---|---|---|
| 5,724,521 A | 3/1998 | Dedrick | |
| 5,740,549 A | 4/1998 | Reilly et al. | |
| 5,848,397 A | 12/1998 | Marsh et al. | |
| 5,948,061 A | 9/1999 | Merriman | |
| 6,026,368 A | 2/2000 | Brown et al. | |
| 6,044,376 A | 3/2000 | Kurtzman, II | |
| 6,078,914 A | 6/2000 | Redfern | |
| 6,144,944 A | 11/2000 | Kurtzman, II et al. | |
| 6,167,382 A | 12/2000 | Sparks et al. | |
| 6,269,361 B1 | 7/2001 | Davis et al. | |
| 6,401,075 B1 | 6/2002 | Mason et al. | |
| 6,820,277 B1 * | 11/2004 | Eldering et al. | 725/35 |
| 6,985,882 B1 | 1/2006 | Del Sesto | |
| 7,039,599 B2 | 5/2006 | Merriman | |
| 7,136,875 B2 | 11/2006 | Anderson et al. | |
| 2004/0210560 A1 * | 10/2004 | Shuster | 707/3 |
| 2004/0259574 A1 * | 12/2004 | Daniels et al. | 455/456.3 |
| 2005/0144067 A1 * | 6/2005 | Farahat et al. | 705/14 |
| 2006/0069784 A2 * | 3/2006 | Hsu et al. | 709/228 |

FOREIGN PATENT DOCUMENTS

WO  WO 97/21183  6/1997

OTHER PUBLICATIONS

U.S. Appl. No. 95/001,073, Reexamination of Stone et al.
U.S. Appl. No. 95/001,061, Reexamination of Stone et al.
U.S. Appl. No. 95/001,069, Reexamination of Stone et al.
U.S. Appl. No. 95/001,068, Reexamination of Stone et al.
Dedrick, R., Interactive Electronic Advertising, IEEE, 1994.
Dedrick, R., A Consumption Model for Targeted Electronic Advertising, Intel Architecture Labs, IEEE, 1995.
Baseview Products, Inc., ClassManagerPro Administration Manual v. 1.0.5, Feb. 1, 1997.
Ad-Star.com website archive from www. Archive.org, Apr. 12, 1997 and Feb. 1, 1997.

(Continued)

*Primary Examiner* — Alvin L Brown
(74) *Attorney, Agent, or Firm* — John C. Pokotylo; Straub & Pokotylo

(57) ABSTRACT

A document, such as a Web page, includes content and a set of related ad links. When a user selects one of the related ad links, they are brought to a linked document including a set of one or more ads. Unless there is an agreement to the contrary (such as a pay per impression agreement), the advertisers do not compensate the document owner for the selection of a related ad link. However, when a user selects one of the ads on the linked document, they are brought to a corresponding ad landing page linked from the ad. The advertisers may compensate the Web page owner for such selections. The related ad links may be automatically generated using document content information, the number, performances, and/or compensation offers of ads corresponding to the related ad link, etc.

26 Claims, 10 Drawing Sheets

OTHER PUBLICATIONS

Information Access Technologies, Inc., Aaddzz brochure, "The Best Way to Buy and Sell Web Advertising Space," © 1997.

Information Access Technologies, Inc., Aaddzz.com website archive from www.Archive.org, archived on Jan. 30, 1998.

AdKnowledge Market Match Planner: Reviewer's Guide, AdKnowledge, May 1998.

AdKnowledge Campaign Manager: Reviewer's Guide, AdKnowledge, Aug. 1998.

Baseview Products, Inc., AdManagerPro Administration Manual v. 2.0, Dec. 1998.

AdForce, Inc., A Complete Guide to AdForce, Version 2.6, 1998.

AdForce, Inc., S-1/A SEC Filing, May 6, 1999.

Business Wire, "Global Network, Inc. Enters Into Agreement in Principle With Major Advertising Agency," Oct. 4, 1999.

Zeff, R. et al., *Advertising on the Internet*, $2^{nd}$ Ed., John Wiley & Sons, 1999.

Request for Reexamination of U.S. Patent No. 7,240,025 B2, Control No. 95/001,073.

Request for Reexamination of U.S. Patent No. 6,446,045 B1, Control No. 95/001,061.

Request for Reexamination of U.S. Patent No. 7,249,059 B2, Control No. 95/001,069.

Request for Reexamination of U.S. Patent No. 6,829,587 B2, Control No. 95/001,068.

\* cited by examiner

WHAT YOU NEED TO KNOW
About   Search [____] [in this topic ▼] GO

About > Automotive > Cars

Cars

Cars Offers > Porsche Boxster        Sponsored Links

Porsche Boxster Prices
Free Porsche Boxster quote from a local dealership
carquote.com

Cheap Porsche Leases
911, Cayenne and Boxster Leases Low prices, Save Thousands
www.SwapaLease.com

Porsche Floor Mats
Selling quality parts since 1964. Check out our price guarantee.
www.performanceproducts.com

Lease Porsche Boxster
Select a Model, Research Specs & Buy your New or Used Auto for Less
www.carsdirect.com

04 Boxster $429mo $39,975
Porsche Boxters Low Fleet Prices Colors Options Nationwide Delivery
FleetRates.com

LA Dismantler for Porsche
Porsche Parts Used & New & Rebuilt 911, 993, 996, Boxster, Turbo, Cars
911pcar.com

Want out of a car lease?
Get out now - No Penalties! Short term car lease -No Money Down
www.leasexit.com

2004 New Car Price Quote
Save time and money. Get a quote online w/o talking to dealer
www.carsearchonline.com

Porsche Boxster S on eBay
Save on new & used items. affiliate Find a porsche boxster s now!
www.eBay.com

1060

About these offers:
These offers are ads that have been purchased by companies that want to have their ads appear next to relevant content, based on a set of keywords they specify. The offers are administered, sorted and maintained by a third party.

PROVIDING LINKS TO RELATED ADVERTISEMENTS

§1. BACKGROUND OF THE INVENTION

§1.1 Field of the Invention

The present invention concerns advertising. In particular, the present invention concerns serving relevant, useful advertisements to users.

§1.2 Background Information

Advertising using traditional media, such as television, radio, newspapers and magazines, is well known. Recently, advertising over more interactive media has become popular. For example, as the number of people using the Internet has exploded, advertisers have come to appreciate media and services offered over the Internet as a potentially powerful way to advertise.

Web page-based ads (also referred to as "Web ads") are often presented to their target audience in the form of "banner ads" (i.e., a rectangular box that includes graphic components), or as "sponsored link" ads in which a list of linked Web pages are provided. When a member of the advertising audience (referred to as a "viewer" or "user" in the Specification without loss of generality) selects one of these ads by clicking on it, embedded hypertext links typically direct the viewer to a Web page (which may be referred to as the "landing page" of the ad) of the advertiser's Website where they can be presented with marketing information, and/or consummate a transaction. A user selection of an ad is commonly referred to as a "clickthrough." As used in the Specification, "Clickthrough" is intended to cover any user selection.

Some Web pages use various targeting techniques to present more relevant ads, and therefore more useful ads, to users. For example, the Google search engine processes a search query to generate search results pages. In addition to search results, these pages may include ads targeted to keywords of the search query. As another example, ads may be targeted to topics or concepts of the content of a Web page.

Regardless of whether or how ads are targeted, an advertiser typically compensates the content (e.g., Web page) owner (and perhaps an ad serving entity). Such compensation may occur whenever the ad is served (per impression), or may be subject to a condition precedent such as a selection, a conversion, etc. Compensation per selection (commonly referred to as "pay per click") is currently becoming popular. For example, referring to FIG. 1, Web page 100 includes content 110, a first set of ads 120 in its right margin and a second set of ads 130 in its lower margin. When a user selects one of the ads of the first set 120, they are brought to (e.g., their browser loads) a corresponding ad landing page 140 linked from the ad 120. Similarly, when a user selects one of the ads of the second set 130, they are brought to a corresponding ad landing page 150 linked from the ad 130. The advertisers compensate the Web page owner for the selection, as indicated by the $ symbols.

Although services such as Google's AdSense™ have enabled advertisers to target ads to the topics or concepts of content on a Web page, some Web pages are fairly general (e.g., autos, careers, health) which makes it difficult to achieve high levels of ad performance, such as the levels of ad performance associated with ads targeted to Web pages having more specific concepts and topics. This is unfortunate because Web pages with more general content are often the most heavily visited (e.g., have the most "page views").

Thus, it would be useful to help advertisers and content owners, such as Web page servers, to bring more useful, relevant ads to users, even in the case of Web pages with more general content.

§2. SUMMARY OF THE INVENTION

The present invention may be used to help advertisers and content owners or Web page servers, to bring more useful, relevant ads to users, even in the case of Web pages with more general content. At least one embodiment consistent with the present invention, accepts document information, selects one or more words or phrases using the accepted document information, and generates a set of links using the selected one or more words or phrases. Each of the links (or at least some of the links), when selected, causes the presentation of a document with at least one advertisement relevant to the selected link.

In at least one embodiment consistent with the present invention, the document information is document relevance information, such as topics or concepts for example.

In at least one embodiment consistent with the present invention, one or more words or phrases are selected by determining a set of ads using the document relevance information, and determining keyword and phrase targeting criteria associated with the ads of the set of ads. Such selection may further include scoring each of the targeting criteria using (A) relevance of the targeting criteria (and/or other ad information) to content of the document, (B) the number of ads associated with the targeting criteria, (C) offer (or revenue) information related to the targeting criteria, (D) the number of ads related to the targeting criteria, (E) performance of the ads related to the targeting criteria, (F) an estimated compensation for the targeting criteria, and/or (G) the uniqueness of the targeting criteria (e.g., to score more unique criteria higher). The selection may also include filtering criteria that are redundant or similar.

At least one embodiment consistent with the present invention further forwards the set of links to a client device on which the document is being rendered. The set of links may be encoded as a JavaScript array, using extensible markup language, as Hypertext Markup Language, or as images.

At least one embodiment consistent with the present invention may be a server for performing one or more of the foregoing acts.

At least one embodiment consistent with the present invention accepts a document including embedded program instructions, or a link to program instructions, executes the program instructions to generate a request for links, accepts a set of links in a reply to the request, and renders the set of links with the document. User input selecting one of the links of the rendered set of links may be accepted. A request for advertisements in response to the user input may be generated and a second document including one or more advertisements in a reply to the request for advertisements may be accepted.

In at least one embodiment consistent with the present invention the request for links includes a link number limit, a maximum footprint of the set of related ad links, a character limit on each link, and/or rules for determining links.

At least one embodiment consistent with the present invention may be performed by client-side device, such as a browser.

§3. BRIEF DESCRIPTION OF THE DRAWINGS

FIGS. 10A and 10B illustrate examples of operations in an exemplary system consistent with the present invention.

§4. DETAILED DESCRIPTION

Figure 1:
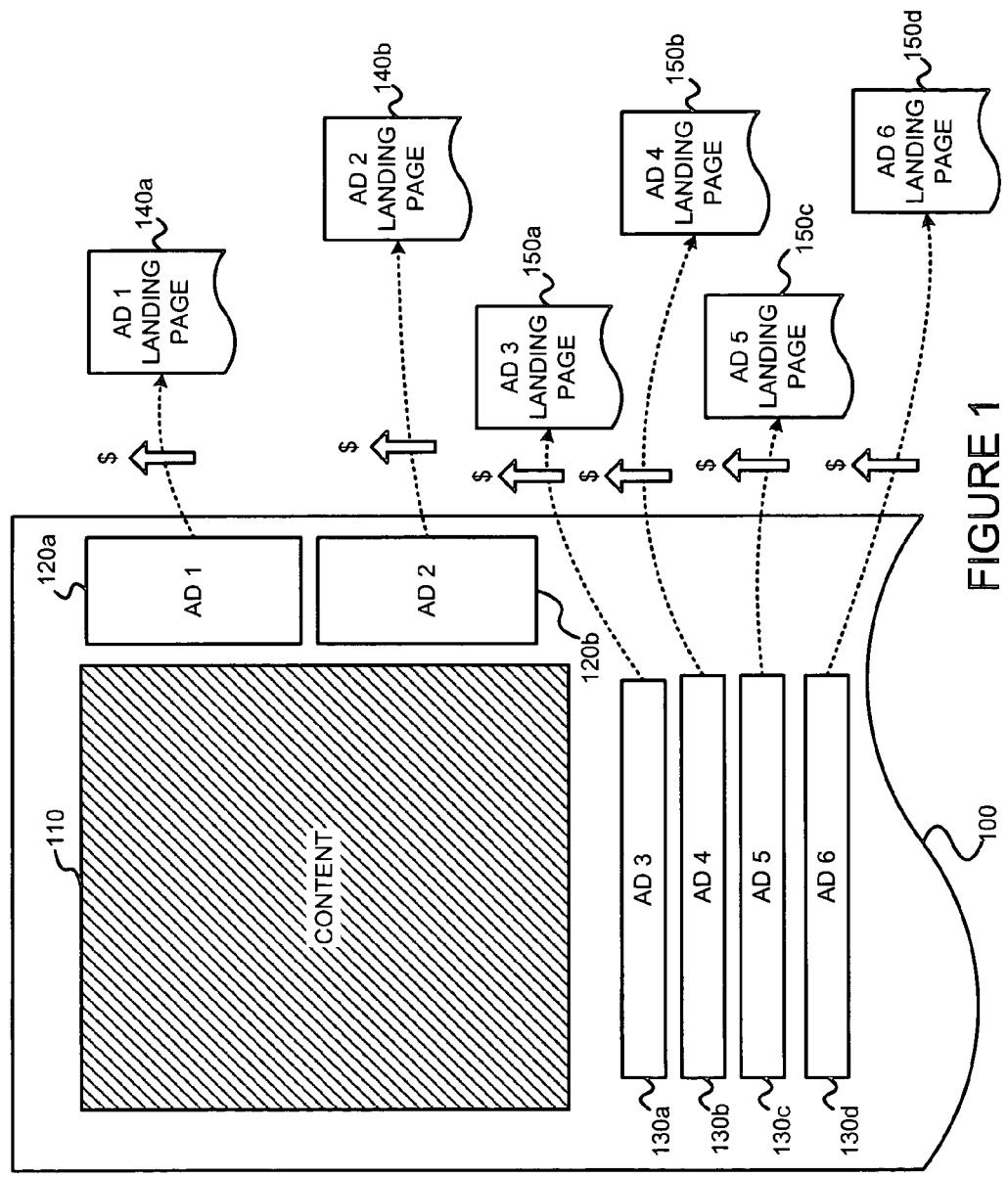
FIG. 1 illustrates a Web page with conventional ads.

The present invention may involve novel methods, apparatus, message formats and/or data structures for helping to bring relevant, useful ads to users. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

In the following, environments in which, or with which, the present invention may operate are described in §4.2. Then, exemplary embodiments of the present invention are described in §4.3. Examples of operations are provided in §4.4. Finally, some conclusions regarding the present invention are set forth in §4.5. First, however, some terms are introduced in §4.1.

§4.1 DEFINITIONS

Online ads may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a document on which, or with which, the ad was served, a search query or search results associated with the serving of the ad, a user characteristic (e.g., their geographic location, the language used by the user, the type of browser used, previous pageviews, previous behavior), a host or affiliate site (e.g., America Online, Google, Yahoo) that initiated the request, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain location, etc. As another example, in some systems, an advertiser may specify that its ad is to be served only if a page or search query includes certain keywords or phrases. As yet another example, in some systems, an advertiser may specify that its ad is to be served only if a document being served includes certain topics or concepts, or falls under a particular cluster or clusters, or some other classification or classifications.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

The ratio of the number of selections (e.g., clickthroughs) of an ad to the number of impressions of the ad (i.e., the number of times an ad is rendered) is defined as the "selection rate" (or "clickthrough rate") of the ad.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's Web page, and consummates a purchase there before leaving that Web page. Alternatively, a conversion may be defined as a user being shown an ad, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Often, if user actions don't indicate a consummated purchase, they may indicate a sales lead, although user actions constituting a conversion are not limited to this. Indeed, many other definitions of what constitutes a conversion are possible.

The ratio of the number of conversions to the number of impressions of the ad (i.e., the number of times an ad is rendered) is referred to as the "conversion rate." If a conversion is defined to be able to occur within a predetermined time since the serving of an ad, one possible definition of the conversion rate might only consider ads that have been served more than the predetermined time in the past.

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as JavaScript, etc.). In many cases, a document has a unique, addressable, storage location and can therefore be uniquely identified by this addressable location. A universal resource locator (URL) is a unique address used to access information on the Internet.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links. Document related information could also include other documents that are semantically close to the instant document.

Content from a document may be rendered on a "content rendering application or device". Examples of content rendering applications include an Internet browser (e.g., Explorer or Netscape), a media player (e.g., an MP3 player, a Realnetworks streaming audio file player, etc.), a viewer (e.g., an Abobe Acrobat pdf reader), etc.

A "content owner" is a person or entity that has some property right in the content of a document. A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary.

"User information" may include user behavior information and/or user profile information.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

§4.3 ENVIRONMENTS IN WHICH, OR WITH WHICH, THE PRESENT INVENTION MAY OPERATE

Figure 2:
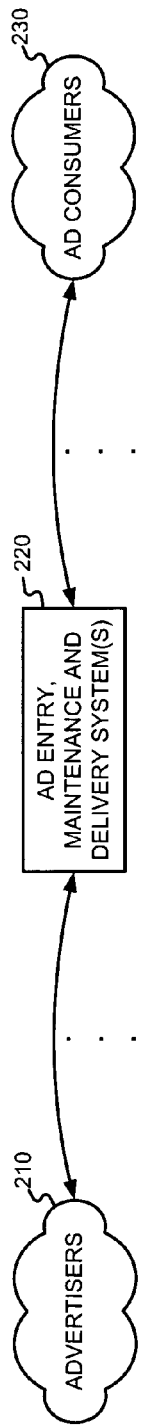
FIG. 2 is a block diagram illustrating parties that may participate in an on-line advertising market.
Figure 3:
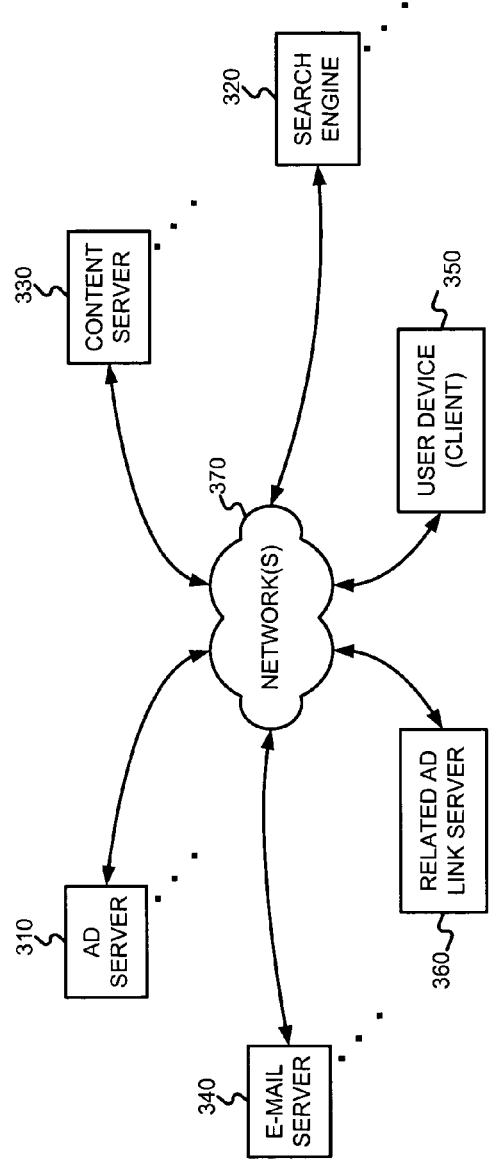
FIG. 3 is a block diagram illustrating an exemplary on-line advertising environment in which, or with which, the present invention may be used.

FIGS. 2 and 3 illustrate exemplary environments in which the present invention may be used. FIG. 2 is a high level diagram of an advertising environment. The environment may include an ad entry, maintenance and delivery system (simply referred to as an ad server) 220. Advertisers 210 may directly, or indirectly, enter, maintain, and track ad information in the system 220. The ads may be in the form of graphical ads such as so-called banner ads, text only ads, image ads, audio ads, video ads, ads combining one of more of any of such components, etc. The ads may also include embedded information, such as a link, and/or machine executable instructions. Ad consumers 230 may submit requests for ads to, accept ads responsive to their request from, and provide usage information to, the system 220. An entity other than an ad consumer 230 may initiate a request for ads. Although not shown, other entities may provide usage information (e.g., whether or not a conversion or click-through related to the ad occurred) to the system 220. This usage information may include measured or observed user behavior related to ads that have been served.

The ad server 220 may be similar to the one described in Figure 2 of U.S. patent application Ser. No. 10/375,900 (referred to as the '900 application and incorporated herein by reference), entitled "SERVING ADVERTISEMENTS BASED ON CONTENT," filed on Feb. 26, 2003 and listing Darrell Anderson, Paul Bucheit, Alex Carobus, Claire Cui, Jeffrey A. Dean, Georges R. Harik, Deepak Jindal, and Narayanan Shivakumar as inventors. An advertising program may include information concerning accounts, campaigns, creatives, targeting, etc. The term "account" relates to information for a given advertiser (e.g., a unique e-mail address, a password, billing information, etc.). A "campaign" or "ad campaign" refers to one or more groups of one or more advertisements, and may include a start date, an end date, budget information, geo-targeting information, end user local time information, syndication information, etc. For example, Honda may have one advertising campaign for its automotive line, and a separate advertising campaign for its motorcycle line. The campaign for its automotive line may have one or more ad groups, each containing one or more ads. Each ad group may include targeting information (e.g., a set of keywords, a set of one or more topics, etc.), and offer or price information (e.g., a maximum cost offer (cost per click-though, cost per conversion, etc.), a cost offer, etc.). Alternatively, or in addition, each ad group may include an average cost offer (e.g., average cost per click-through, average cost per conversion, etc.). Therefore, a single maximum cost and/ or a single average cost may be associated with one or more keywords, and/or topics. As stated, each ad group may have one or more ads or "creatives" (That is, ad content that is ultimately rendered to an end user). Other definitions of what constitutes an ad group are possible. Each ad may also include a link to a URL (e.g., a landing Web page, such as the home page of an advertiser, or a Web page associated with a particular product or service). Naturally, the ad information may include more or less information, and may be organized in a number of different ways.

FIG. 3 illustrates an environment 300 in which the present invention may be used. A user device (also referred to as a "client" or "client device") 350 may include a browser facility (such as the Explorer browser from Microsoft, the Opera Web Browser from Opera Software of Norway, the Navigator browser from AOL/Time Warner, etc.), an e-mail facility (e.g., Outlook from Microsoft), or any other software application or hardware device used to render content. A search engine 320 may permit user devices 350 to search collections of documents (e.g., Web pages). A content server 310 may permit user devices 350 to access documents. An e-mail server (such as Hotmail from Microsoft Network, Yahoo Mail, etc.) 340 may be used to provide e-mail functionality to user devices 350. An ad server 310 may be used to serve ads to user devices 350. The ads may be served in association with search results provided by the search engine 320. Content-relevant ads may be served in association with content provided by the content server 330, and/or e-mail supported by the e-mail server 340 and/or user device e-mail facilities.

As discussed in the '900 application (introduced above), ads may be targeted to documents served by content servers. Thus, one example of an ad consumer 230 is a content server 330 that receives requests for documents (e.g., articles, discussion threads, music, video, graphics, search results, Web page listings, etc.), and retrieves the requested document in response to, or otherwise services, the request. The content server 330 may submit a request for ads to the ad server 220/310. Alternatively, or in addition, a user device 350 may submit such a request. Such an ad request may include a number of ads desired. The ad request may also include document request information. This information may include the document itself (e.g., page), a category or topic corresponding to the content of the document or the document request (e.g., arts, business, computers, arts-movies, arts-music, etc.), part or all of the document request, content age, content type (e.g., text, graphics, video, audio, mixed media, etc.), geolocation information, end user local time information, document information, etc.

The content server 330, and/or user device 350 may combine the requested document with one or more of the advertisements provided by the ad server 220/310. This combined information including the document content and advertisement(s) is then forwarded towards, and/or rendered on, the end user device 350 that requested the document, for presentation to the user. Finally, the content server 330 may transmit information about the ads and how, when, and/or where the ads are to be rendered (e.g., position, clickthrough or not, impression time, impression date, size, conversion or not, etc.) back to the ad server 220/310. Alternatively, or in addition, such information may be provided back to the ad server 220/310 by some other means. Consistent with the present invention, the ad server 220/310 may store ad performance information.

Another example of an ad consumer 230 is the search engine 320. A search engine 320 may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine 320 may submit a request for ads to the ad server 220/310. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as end user local time information, geolocation information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web pages), full text of identified documents, topics of identified documents, feature vectors of identified documents, etc.

The search engine 320 may combine the search results with one or more of the advertisements provided by the ad server 220/310. This combined information including the search results and advertisement(s) is then forwarded towards the user that submitted the search, for presentation to the user. Preferably, the search results are maintained as distinct from the ads, so as not to confuse the user between paid advertisements and presumably neutral search results.

Finally, the search engine 320 may transmit information about the ad and when (e.g., end user local time), where (e.g., geolocation), and/or how the ad was to be rendered (e.g., position, click-through or not, impression time, impression date, size, conversion or not, etc.) back to the ad server 220/310. Alternatively, or in addition, such information may be provided back to the ad server 220/310 by some other means.

The e-mail server 340 may be thought of, generally, as a content server in which a document served is simply an e-mail. Further, e-mail applications (such as Microsoft Outlook for example) may be used to send and/or receive e-mail. Therefore, an e-mail server 340 or application may be thought of as an ad consumer 230. Thus, e-mails may be thought of as documents, and targeted ads may be served in association with such documents. For example, one or more ads may be served in, under, over, or otherwise in association with an e-mail.

The related ad link server 360 may be used to generate a set of one or more links to a document (e.g., a Web page), such that each document would include one or more ads. The related ad link server 360 may use information from a first document (e.g., provided by the user device 350 and/or from the content server 330) to insert a listing of one or more links to additional documents, each with one or more ads. The one or more ads residing on each of the additional documents linked to may be generated by the ad server 310. Thus, the related ad link (also referred to as "Radlink" below) server 360 may be thought of as an ad consumer 230.

The various servers may exchange information via one or more networks 370, such as the Internet for example.

§4.3 EXEMPLARY EMBODIMENTS

Figure 4:
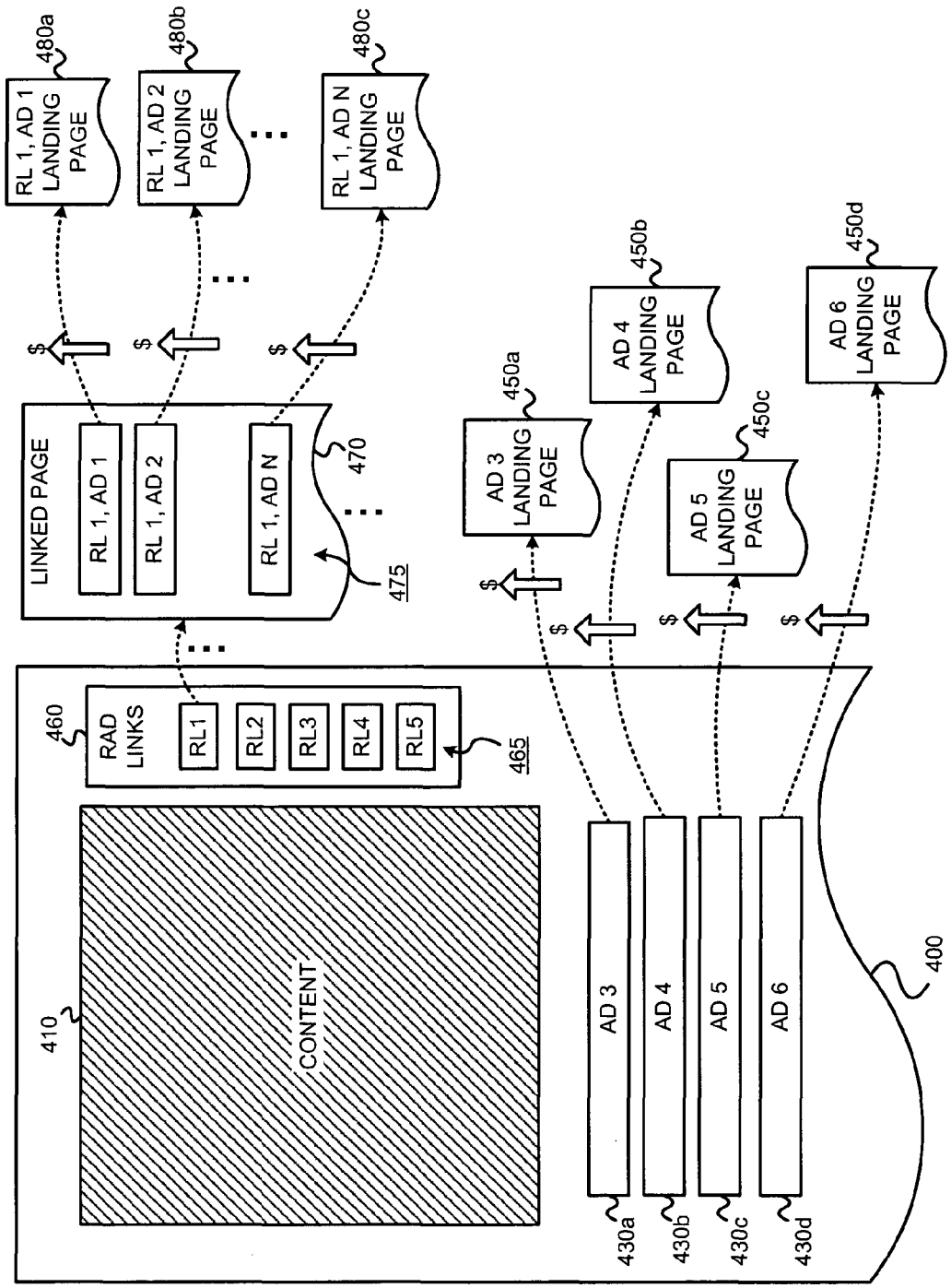
FIG. 4 illustrates a Web page provided with related ad links in a manner consistent with the present invention.

The present invention may be used to help advertisers and content owners, or Web page servers, to bring more useful, relevant ads to users. The present invention may do so by providing links to documents, such as Web pages, that include related ads. FIG. 4 is a diagram of a Web page 400 that includes content 410, a set of ads 430 in its lower margin, and a set 460 of related ad links 465 in its left margin.

When a user selects one of the ads 430, they are brought to a corresponding ad landing page 450 linked from the ad 430. The advertisers compensate the Web page owner for the selection, as indicated by the $ symbols. When a user selects one of the related ad links 465, they are brought to a linked Web page 470 (only one shown to simplify the drawing) including a set of one or more ads 475. Note that, unless there is an agreement to the contrary (such as a pay per impression agreement), the advertisers do not compensate the Web page owner for the selection. However, when a user selects one of the related link ads 475, they are brought to a corresponding ad landing page 480 linked form the ad 475. The advertisers compensate the Web page owner for such selections.

As this example illustrates, rather than a single selection compensation scheme, the present invention supports a double selection compensation scheme. This is the case with pay per selection schemes. The present invention also supports a pay per impression scheme under which a selection of a related ad link 465 causes an impression of ads 475, and consequently compensation. The present invention also supports a pay per conversion scheme under which a selection of a related ad link 465 causes an impression of ads 475 on page 470. Compensation is subject to a condition precedent; namely a conversion related to one of the ads 475.

Figure 5:
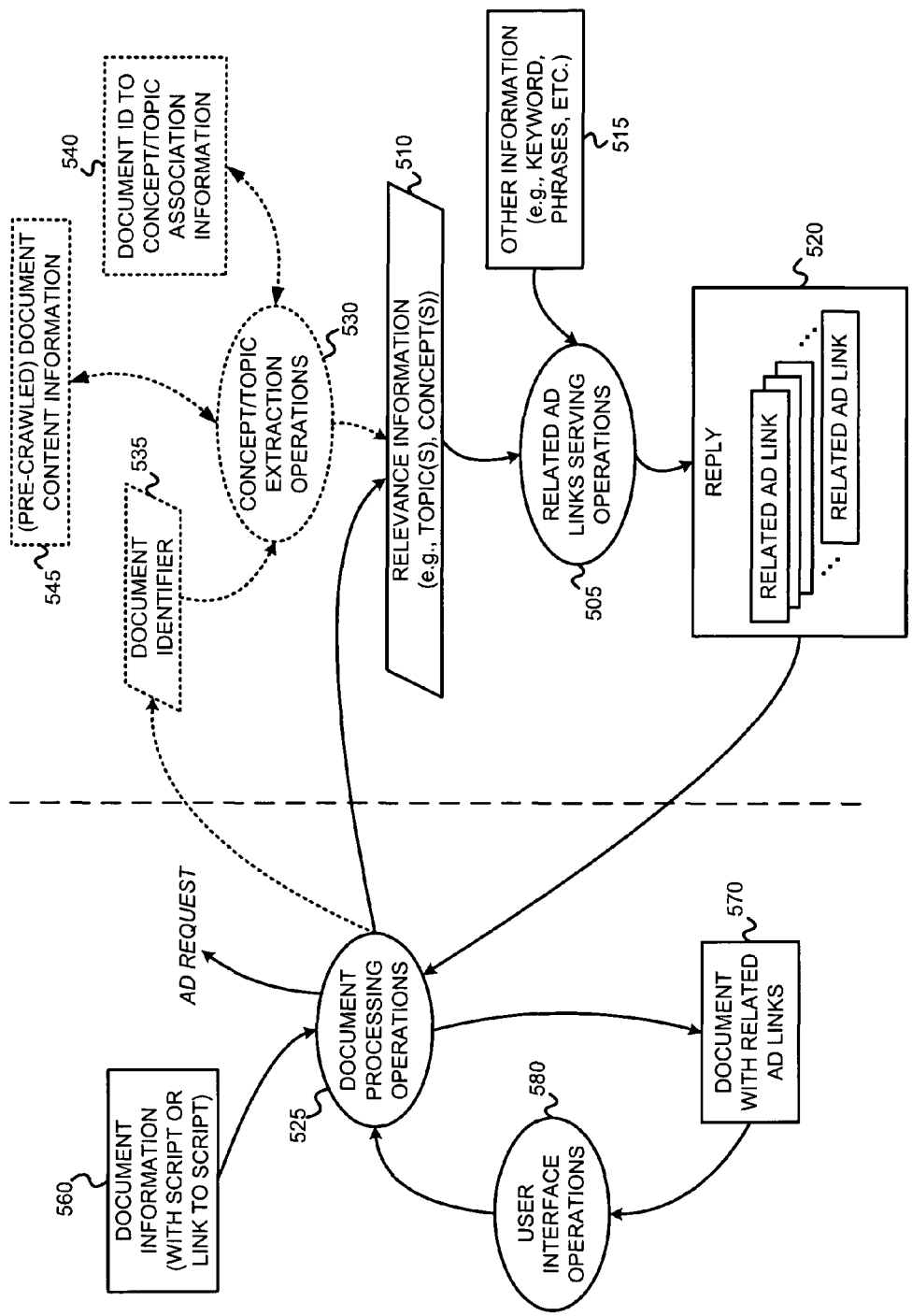
FIG. 5 is a bubble diagram of operations that may be performed by an exemplary related ad link server and a client-side device or content server, and that are consistent with the present invention, as well as information that may be generated and/or used by such operations.

FIG. 5 is a bubble diagram of operations that may be used by an exemplary related ad link server (See the right side of dashed line 590) and a client-side device or content server (See the left side of dashed line 590), that are consistent with the present invention, as well as information that may be generated and/or used by such operations. Related ad links serving operations 505 accept document relevance information 510 and use such accepted information, along with other information 515, to generate a set 520 of one or more related ad links. As shown, this set 520 of one or more related ad links may be provided as a reply to document processing operations 525.

The other information 515 may include an association of topics/concepts/clusters to targeting keywords and/or phrases used by advertisers to target the serving of their ads. Alternatively, or in addition, the other information 515 may include cost (and/or revenue) per selection, cost (and/or revenue) per conversion, etc. information associated with the keywords and/or phrases. Indeed, the keywords and/or phrases may be ordered using such cost (and/or revenue) information. Alternatively, or in addition, the other information 515 may include monetization information associated with the keywords and/or phrases. Alternatively, or in addition, the other information 515 may include performance feedback information such as selection rate, conversion rate, etc. The other information 515 (e.g., keywords/phrases, costs of such keywords/phrases, performances of such keywords/phrases, monetization of such keywords/phrases) may be tracked and organized with various levels of granularity, such as on one or more of (a) a per document basis, (b) a per concept/topic/cluster basis, (c) a per partner basis, and (d) a per channel basis.

The document relevance information 510 may have been provided from document processing operations (e.g., a browser residing on a user client device, or a document server) 525. Such document relevance information 510 may include topics, concepts, and/or clusters related to the content of the document 560. In at least one embodiment consistent with the present invention, the document relevance information 510 may be provided by relevance information extraction operations 530 which may use a document identifier 535 and document identifier-to-document relevance information association information 540, and/or (e.g., pre-crawled) document content information 545, to generate such document relevance information 510. Examples of such operations 530 are described in the '900 application.

The document processing operations 525 may be performed on a client-side device such as a browser, on a document server, or in a distributed manner across both. The document processing operations 525 may render a document from document information 560. The document information 460 may include executable code, such as JavaScript for example, or a link to such executable code, for sending document identification information, or document relevance information (See, e.g., the '900 application) to the related ad link server. The document processing operations 525 may use the related ad links 520 to generate a rendered document with related ad links 570.

User interface operations 580 may accept user input and render document content to a user. For example, if a user selects a related ad link, the user interface operations 580 may provide an indication of such a selection to the document processing operations 525. The document processing operations 525 may then load the document (e.g., a Web page) linked to by the related ad link. The document may be populated with one or more ads. The ads may have been predetermined, or may be determined in real time. To minimize communications and processing overhead, it may be desirable to determine the ads only after a related ad link is selected. The ads may have been determined by an ad server, such as the Google AdWords™ server.

§4.3.1 Exemplary Methods

Figure 6:
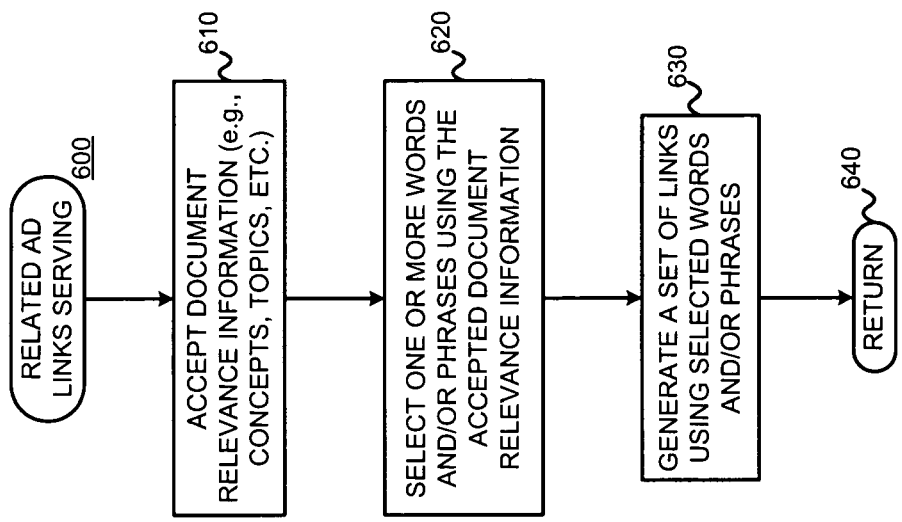
FIG. 6 is a flow diagram of an exemplary method that may be used to serve related ad links in a manner consistent with the present invention.

FIG. 6 is a flow diagram of an exemplary method 600 that may be used to serve related ad links in a manner consistent with the present invention. Document relevance information, such as topics, concepts, clusters, for example, is accepted. (Block 610) Then, one or more words and/or phrases are selected using the accepted document relevance information. (Block 620) Finally, a set of links is generated using the selected words and/or phrases (Block 603) before the method 600 is left (Node 640).

Figure 7:
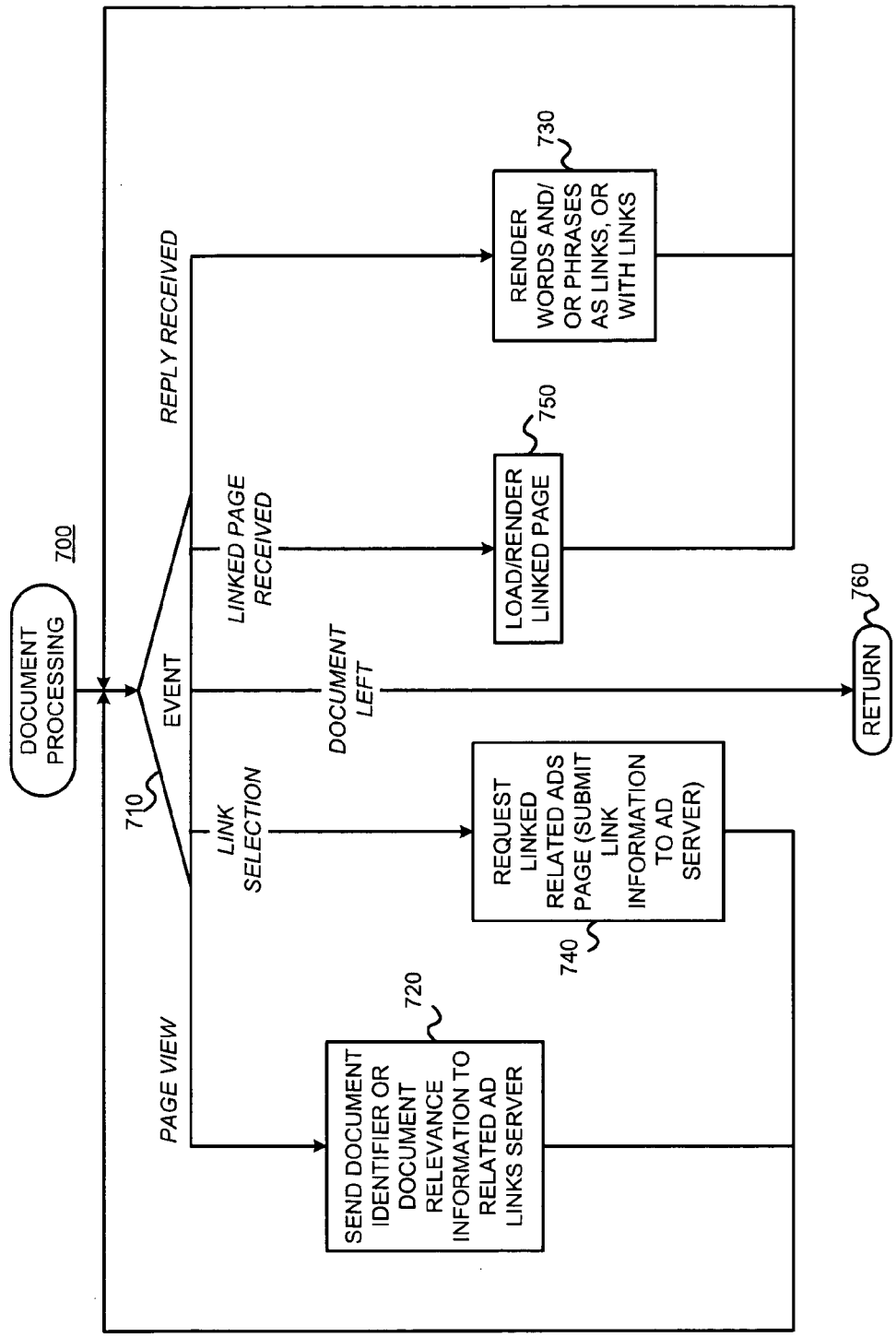
FIG. 7 is a flow diagram of an exemplary method that may be used to process documents in a manner consistent with the present invention.

FIG. 7 is a flow diagram of an exemplary method 700 that may be used to process documents in a manner consistent with the present invention. Various branches of the method 700 may be performed in response to the occurrence of various events. (Block 710) For example, if a page view (or some other rendering) of the document occurs, document relevance information, or information from which document relevance information can be located or derived, is forwarded to the related ad links server as a part of a request for related ad links. (Block 720) Note that such a request may include additional information, such as how many related ad links are desired, the maximum number of related ad links permitted, a maximum ad link size, whether related ad links should be filtered to avoid duplication, etc.

If a reply is received, related words and/or phrases of the reply are rendered as links (possibly by a browser such as Microsoft's Internet Explorer), or are rendered with links. (Block 730)

If a link is selected, the linked related ad page is requested. (Block 740) If the related ad page already exists, the request may simply be a command to load the existing related ad page. If the related ad page does not already exist, the request may include submitting link information (e.g., words and/or phrases) to an ad server. If a linked page is received, it is loaded and rendered. (Block 750)

If the document is left, the method 700 is left. (Node 760)

Note that pages discussed above may be Web pages. Alternatively, the pages discussed above may be any document.

§4.3.2 Exemplary Apparatus

Figure 8:
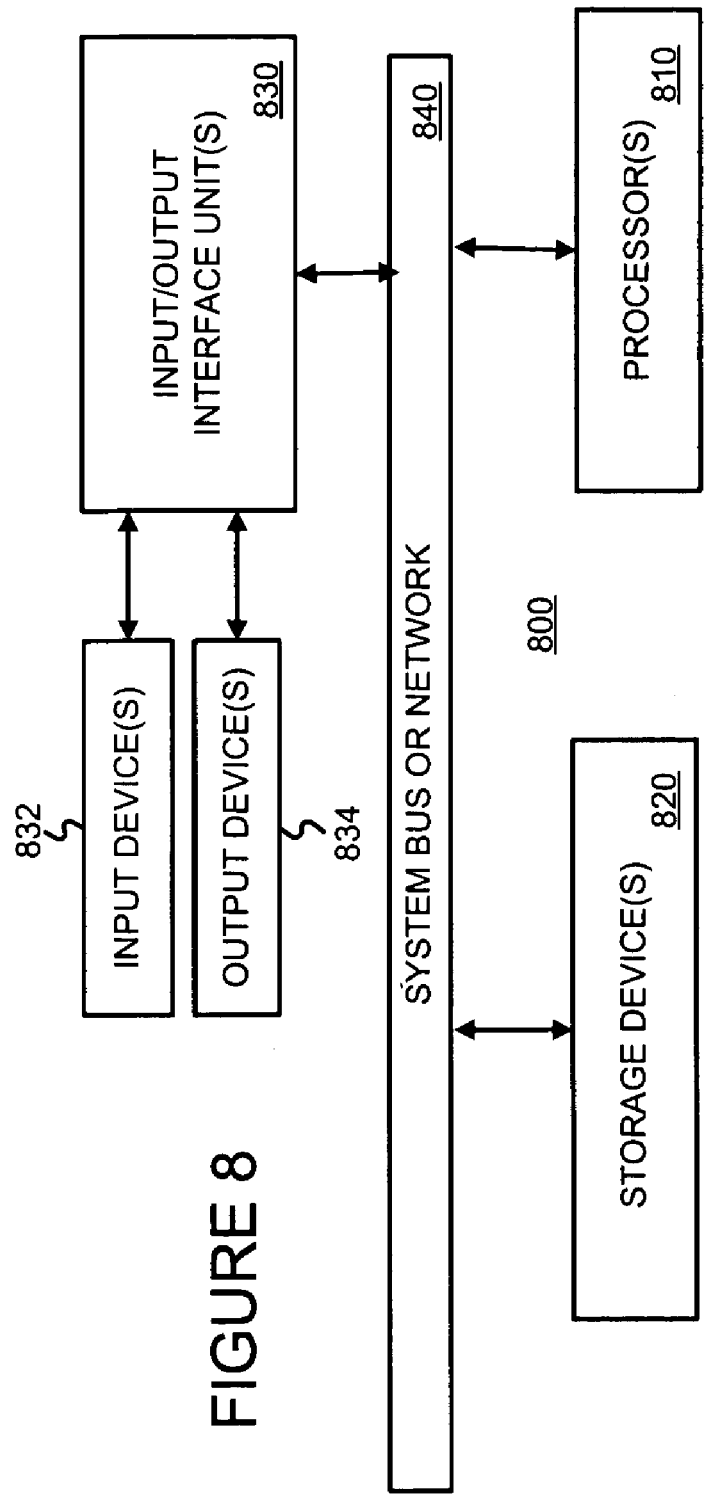
FIG. 8 is block diagram of a machine that may perform one or more operations and store information used and/or generated in a manner consistent with the present invention.

FIG. 8 is block diagram of a machine 800 that may perform one or more of the operations discussed above. The machine 800 may include one or more processors 810, one or more input/output interface units 830, one or more storage devices 820, and one or more system buses and/or networks 840 for facilitating the communication of information among the coupled elements. One or more input devices 832 and one or more output devices 834 may be coupled with the one or more input/output interfaces 830.

The one or more processors 810 may execute machine-executable instructions (e.g., C or C++, Java, etc., running on the Solaris operating system available from Sun Microsystems Inc. of Palo Alto, Calif. or the Linux operating system widely available from a number of vendors such as Red Hat, Inc. of Durham, N.C.) to perform one or more aspects of the present invention. At least a portion of the machine executable instructions may be stored (temporarily or more permanently) on the one or more storage devices 820 and/or may be received from an external source via one or more input interface units 830.

In one embodiment, the machine 800 may be one or more conventional personal computers. In this case, the processing units 810 may be one or more microprocessors. The bus 840 may include a system bus. The storage devices 820 may include system memory, such as read only memory (ROM) and/or random access memory (RAM). The storage devices 820 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 832, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 810 through an appropriate interface 830 coupled to the system bus 840. The output devices 834 may include a monitor or other type of display device, which may also be connected to the system bus 840 via an appropriate interface. In addition to (or instead of) the monitor, the personal computer may include other output devices (not shown), such as speakers and printers for example.

The various operations described above may be performed by one or more machines 800, and the various information described above may be stored on one or more machines 800.

The ad server 310, search engine 320, content server 330, e-mail server 340, user device 350, and/or related ad link server 360 may include one or more machines 800.

§4.3.3 Refinements and Alternatives

How To Invoke The Serving of Related Ad Links

The source document may include embedded executable code, or a link to such code, for performing or invoking one or more of the operations described above. Examples of such code are provided here.

In at least one embodiment consistent with the present invention, a client device browser may, upon processing a document with appropriate JavaScript or a pointer to such JavaScript, generate a request for related ad links. The following example illustrates a possible "GET" request for related ad links.

```
GET /pagead/ads?client=$CLIENT&format=$FORMAT&random=
$RANDOM#&url=$URL
    &adsafe=[medium|high]&output=[js|xml|xml_no_dtd]
    &contents=$CONTENT&hints=$HINTS&num=$NUM ADS
    &num_radlinks=$NUM RADLINKS
    &max_radlink_len=$MAX RADLINK LEN
    &rl_filtering=[off,low,medium,high]
``` where "num_radlinks" is the number of related ad links that are to be returned, "max_radlink_len" is the number of characters or bytes a given related ad link may take up, "rl_filtering" is a level of duplication filtering that indicates how aggressive a related ad link server should be in trying to minimize duplication in the returned related ad links (e.g., the levels may range from 'off' for no filtering, to 'high' for maximum filtering of duplicates such as "hotel in new york" and "new york hotel")_and "GET" may represent an "http://" address path segment.

The following example illustrates a possible JavaScript request for related ad links.

```
<script type="text/javascript" language="JavaScript">
<!--
    google_ad client = 'some_domain_id_trackable_for_radlinks';
        google_ad_width = 120;
        google_ad_height = 600;
        google_safe = 'high';
        google_ad_output = 'js'
        google_num_radlinks = 10;
        google_max_radlink_len = 30;
        google_rl_filtering = "medium";
// -->
</script>
```

The related ad links server may return XML or JavaScript, depending on the form specified in the request, including the related ad links. The following is an XML template, consistent with the present invention, which may be used to return related ad links to the client device browser.

```
<?xml version="1.0" encoding="{{ENCODING_NAME}}"
standalone="no"?>
{{BI_NEWLINE}}
{{! Partners will normally make requests with output=xml_no_dtd    }}
{{! in order to not have to request the dtd every time. In          }}
```

```
{{! those cases, hide the DTD SECTION.                          }}
{{#DTD_SECTION}}
<!DOCTYPE GSP SYSTEM "contentxml.dtd"> {{BI_NEWLINE}}
{{/DTD_SECTION}}
<GSP VER="3.2"> {{BI_NEWLINE}}
{{! Code within ADS_SECTION will contain 1 or 0 <ADS>          }}
{{! sections (i.e., if there are no ads, we will hide this     }}
{{! section                                                    }}
{{#ADS_SECTION}}
<ADS> ((BI_NEWLINE}}
{{! Code within ONE_AD_SECTION will be repeated once
per ad                                                         }}
{{#ONE_AD_SECTION}}
{{! All template vars within double-quotes should be HTML      }}
{{! escaped. The BI_SPACEs ensure that                         }}
{{! whitespace is inserted between each attribute.             }}
<AD n="{{ONE_BASED_POS}}" {{BI_NEWLINE}}
    {{BI_SPACE}} type="text/narrow" {{BI_NEWLINE}}
    {{BI_SPACE}} url="{{REDIRECT_URL}}" {{BI_NEWLINE}}
    {{BI_SPACE}} visible_url="{{VISIBLE_URL}}">
{{BI_NEWLINE}}
<LINE1>{{TAG_LINE}}</LINE1> {{BI_NEWLINE}}
<LINE2>{{SMALL_CALL_TO_ACTION}}</LINE2>
{{BI_NEWLINE}}
<LINE3>{{SMALL_IMAGE}}</LINE3> {{BI_NEWLINE}}
</AD> {{BI_NEWLINE}}
{{/ONE_AD_SECTION}}
</ADS> {{BI_NEWLINE}}
{{/ADS_SECTION}}
{{! Code within RADLINKS_SECTION will contain 1 or 0
<RADLINKS>   }}
{{! sections (i.e., if there are no rads, we will hide this    }}
{{! section                                                    }}
{{#RADLINKS_SECTION}}
<RADLINKS> {{BI_NEWLINE}}
{{! Code within ONE_RADL_SECTION will be repeated
once per rad                                                   }}
{{#ONE_RADLINK_SECTION}}
{{! All template vacs within double-quotes should be HTML      }}
{{! escaped. The BI_SPACES ensure that                         }}
{{! whitespace is inserted between each attribute.             }}
<RADLINK n="{{ONE_BASED_POS}}" {{BI_NEWLINE}}
    {{BI_SPACE}} url="{{REDIRECT_URL}}" {{BI_NEWLINE}}
<LINE1>{{TAG_LINE}}</LINE1> {{BI_NEWLINE}}
</RADLINK> {{BI_NEWLINE}}
{{/ONE_RADLINK_SECTION}}
</RADLINKS> {{BI_NEWLINE}}
{{/RADLINKS_SECTION}}
</GSP>
``` where n is a position or related ad link number starting at 1, url is the redirect URL which when clicked on will take the user to a page full of ads for the clicked related ad link, and LINE1 is the text of the related ad link. e.g. "Car Parts" or "Stock Charts", etc.

The following is a JavaScript template, consistent with the present invention, which may be used to return related ad links to the client device browser.

```
{{! This code is designed for JavaScript1.1 and above, meaning    }}
{{! it is limited to IE4+, Opera3+, and Netscape3+                }}
{ {{BI_NEWLINE}}
    var google_ads = new Array( ); {{BI_NEWLINE}}
    var google_radlinks = new Array( ); {{BI_NEWLINE}}
    var google_ad; {{BI_NEWLINE}}
    var google_radlink; {{BI_NEWLINE}}
    {{! Code within ONE_AD_SECTION will be repeated once per ad }}
{{#ONE_AD_SECTION}}
google_ad = new Object( ); {{BI_NEWLINE}}
google_ad.n = {{ONE_BASED_POS}}; {{BI_NEWLINE}}
{{! All template vars within double-quotes should be HTML-      }}
{{! escaped                                                     }}
google_ad.url = "{{REDIRECT_URL}}"; {{BI_NEWLINE}}
google_ad.visible_url = "{{VISIBLE_URL}}"; {{BI_NEWLINE}}
google_ad.line1 = "{{TAG_LINE}}"; {{BI_NEWLINE}}
google_ad.line2 = "{{SMALL_CALL_TO_ACTION}}";
{{BI_NEWLINE}}
google_ad.line3 = "{{SMALL_IMAGE}}"; {{BI_NEWLINE}}
{{! Add this ad to the array that we will pass to               }}
{{! google_ad_request_done                                      }}
google_ads[{{POS}}] = google_ad; {{BI_NEWLINE}}
{{/ONE_AD_SECTION}}
{{! Code within ONE_RADLINK_SECTION will be repeated
once per radlink}}
{{#ONE_RADLINK_SECTION}}
google_radlink = new Object( ); {{BI_NEWLINE}}
google_radlink.n = {{ONE_BASED_POS}}; {{BI_NEWLINE}}
{{! All template vars within double-quotes should be HTML-      }}
{{! escaped                                                     }}
google_radlink.url = "((REDIRECT URL))"; {{BI_NEWLINE}}
google_radlink.line1 = "{{TAG_LINE"}}; {{BI_NEWLINE}}
{{! Add this rad to the array that we will pass to              }}
{{! google_ad_request_done                                      }}
google_radlinks[{{POS}}] = google_radlink; {{BI_NEWLINE}}
{{/ONE_RADLINK_SECTION}}
{{! google_ad_request_done should be defined by the partner     }}
{{! in their source before their request for show_ads.js        }}
if (window.google_ad_request_done) { {{BI_NEWLINE}}
    google_ad_request_done(google_ads); {{BI_NEWLINE}}
} {{BI_NEWLINE}}
{{! google_radlink_request_done should be defined by the
partner     }}
{{! in their source before their request for show_ads.js        }}
if (window.google_radlink_request_done) { {{BI_NEWLINE}}
    google_radlink_request_done(google_radlinks);
{{BI_NEWLINE}}
} {{BI_NEWLINE}}
}
``` where radlinks is an array of "radlink" objects, radlink is an object that holds information about a Radlink, n is a position or related ad link number starting at 1, url is the redirect URL which when clicked on will take the user to a page full of ads for the clicked related ad link, and LINE1 is the text of the related ad link. e.g. "Car Parts" or "Stock Charts", etc.

Whether To Provide A Set Of One Or More Related Ad Links (In Place of Something Else)

The foregoing examples may have assumed that related ad links were to be provided. However, at least one exemplary embodiment consistent with the present invention may decide if and when to serve related ad links. For example, there may be instances in which related ad links may be provided instead of one or more ads, while there may be other instances in which one or more ads are shown instead of related ad links. The decision may use relative usefulness of ads and related ad links to users. This usefulness may be tracked. Alternatively, or in addition, the decision may use actual or expected revenue of serving ads versus serving related ad links. In at least some embodiments of the present invention, the decision may consider a ranking or score of a set of one or more related ad links versus a ranking or score of one or more ads that the set of related ad links may replace. For example, a ranking or score of a set of one or more related ad links may be a function of an estimated and/or tracked revenue per impression from the computed ad collections that each of the one or more related ads link points to. From this, it can be determined how much a selection of the related ad link is worth. Given an estimated and/or tracked selection rate on each of the related ad links, the rank or score of the set of one or more related ad links can be compared with that of the alternative one or more ads to maximize overall revenue.

Thus, decision scores may be determined using one or more of: (i) the number of ads (just a few, or a lot) included in the document referred to by the related ad link under consideration; (ii) the number of related ad links in the set; (iii) the expected performance of the ads (good selection rate or conversion rate, or poor selection rate or conversion rate) included in the document referred to by the related ad link under consideration; (iv) the expected performance of the related ad links; (v) the expected monetization (e.g., cost (or revenue) per click*clickthrough rate) of the related ads link(s) (which may be a function of the expected monetization of the ads); etc. Scores may be increased or decreased using general related ad link performance per document, per topic or concept, per cluster, etc.

Figure 9:
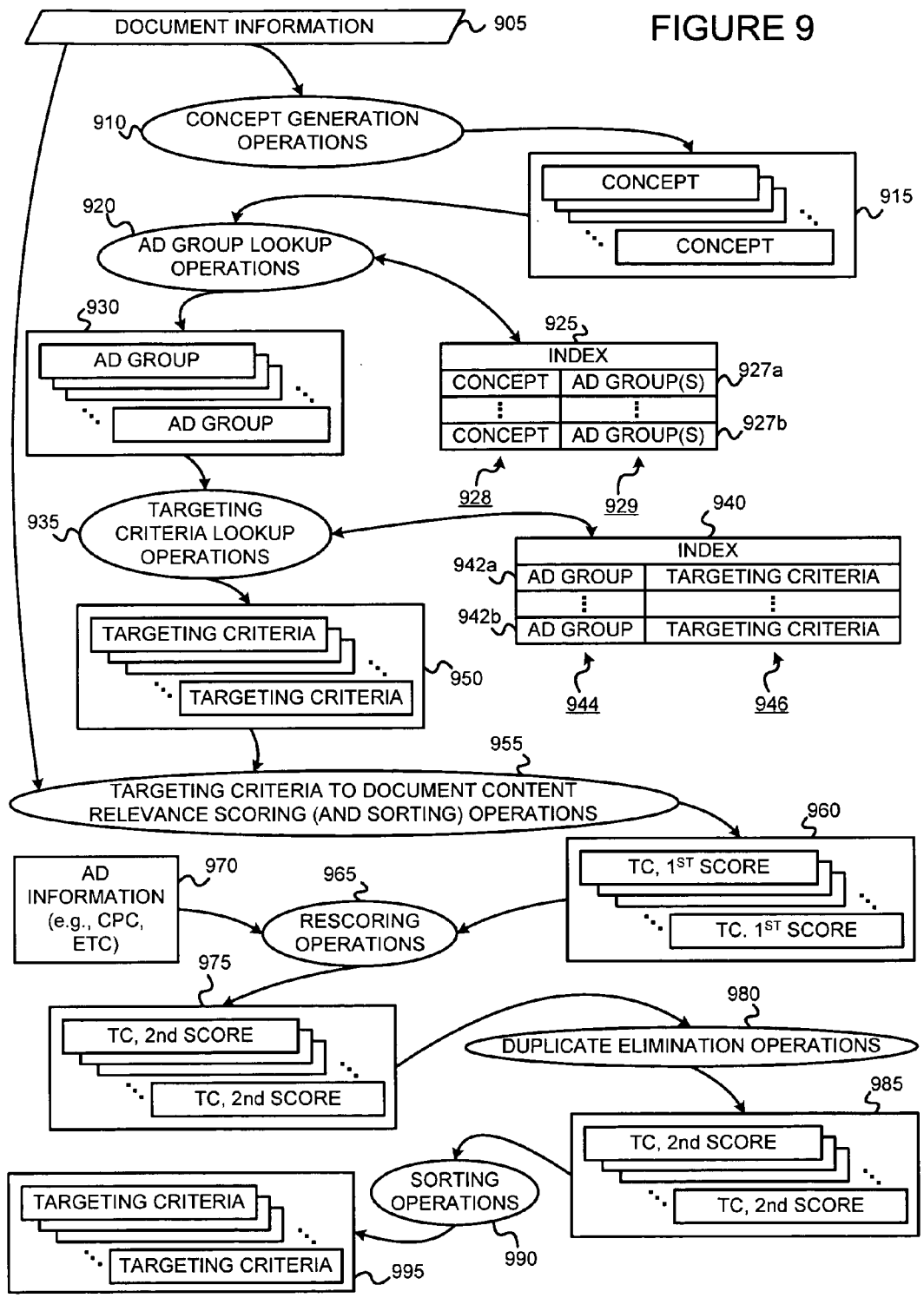
FIG. 9 is a bubble chart of an exemplary embodiment, consistent with the present invention, which may be used to select related ad links.

Referring back to operation 505 of FIG. 5 and blocks 620 and 630 of FIG. 6, related ad links may be served using document information and ad information. In at least one embodiment consistent with the present invention, the related ad links may be words and/or phrases used to target the serving of ads (referred to as "targeting criteria" or "TC"). In at least one such embodiment, selecting related ad links may use the relevancy of ad group TC to the document content, cost per click (CPC) (or revenue per click (RPC) information of the TC, offer information (e.g., price per impression/selection/conversion, maximum price per impression/selection/conversion) related to the TC, the number of ads related to the TC, the performance of the ads (e.g., selection rate, conversion rate, etc.) related to the TC, an estimated compensation for the TC (e.g., ad 1 offer for desired action*probability of desired action+ad 2 offer for desired action*probability of desired action+ . . . ), etc. FIG. 9 is a bubble chart of a particular exemplary implementation of such an embodiment, consistent with the present invention.

Referring to FIG. 9, concept generation operations 910 can be used to generate topics or concepts 915 from document information 905. This may be done, for example, using techniques described in U.S. Provisional Application Ser. No. 60/416,144 (incorporated herein by reference and referred to as "the '144 provisional"), entitled "METHODS AND APPARATUS FOR PROBABILISTIC HIERARCHICAL INFERENTIAL LEARNER," filed on Oct. 3, 2002. The '144 provisional describes exemplary ways to determine one or more concepts or topics (referred to as "phil clusters") of information that may be used consistent with the principles of the present invention. Similarly, concepts can be derived from ad information. An index 925 including a plurality of entries 927, each of the entries 927 including a concept (or concept identifier) 928 and one or more associated ad groups (or ad group identifiers) 929, may be provided. Ad group lookup operations 920 may use the concepts 915 to lookup corresponding ad groups 929 from the index 925 to generate a set of ad groups 930.

An ad group may have targeting criteria associated with it. Targeting criteria (also referred to as "serving constraints") may include keywords and/or phrases used to target the serving of ads belonging to the ad group. An index 940 including entries 942, each of the entries including an ad group (or an ad group identifier) 944 and associated targeting criteria 946, may be provided. Targeting criteria lookup operations 935 may use ad group information 930 to lookup corresponding targeting criteria 946 in the index 940, and generate a set of targeting criteria 950.

Targeting criteria to document content relevance scoring (and sorting) operations 955 may accept the set of targeting criteria 950 and the document information 905 to score the targeting criteria using their relevance to the document, and to sort the scored targeting criteria using their scores. The operations 955 may use techniques described in the '144 provisional. The set of sorted targeting criteria (which may include their associated relevance score (referred to a the "first score")) 960 results.

Rescoring operations 965 may rescore the sorted targeting criteria of set 960 using ad information (e.g., number of ads using the targeting criteria, CPC of the targeting criteria, performance (e.g., selection rate) of the targeting criteria, etc.) 970 to generate a set 975 of scored targeting criteria.

The two stages of scoring avoid targeting criteria with a low relevance score, but a very high monetization. Otherwise, if only a single stage of scoring were used, an undesirable situation in which a link to unrelated, yet highly monetizable, ads is given preference could occur. The first scoring by operations 955 merely provides a "relevance" score from the targeting criteria to the document. The relevance score may be used as a basis of computing the actual "monetization" score (which may consider cost per selection, number of ads, ad performance, etc.). Also, once the "relevance score" is determined and targeting criteria are sorted using the relevance score, targeting criteria whose "relevance score" is too low may be filtered out, since this would indicate such criteria are unrelated to the document. The rescoring operations 965 process the remaining targeting criteria (the ones with "good" relevance scores), and use the "relevance score" in conjunction with other factors (e.g., the number of ads, cost per selection, performance, etc.) to compute a new score (e.g., a monetization score). Finally, the targeting criteria are sorted using the new score to come up with a set of targeting criteria candidates that are both relevant and high scoring (e.g., highly monetizable). An exemplary method for rescoring the targeting criteria is described later.

Duplicate elimination operations 980 can be used to eliminate targeting criteria that are "too similar" to others and can process the set 975 of targeting criteria to generate a new set 985 of targeting criteria. An exemplary method for eliminating duplicate targeting criteria is described later.

Finally, sorting operations 990 may be used to sort the set 985 of targeting criteria using their second scores to generate another set 995 of targeting criteria. The N best targeting criteria, where N may be a predetermined number, or a number relayed in the request for related ad links, may be processed into related ad links and provided back to the client device that requested the related ad links. Naturally, other techniques for selecting related ad links may be used.

As discussed above with reference to operations 965, targeting criteria may be rescored. More specifically, in at least one exemplary embodiment consistent with the present invention, a relevancy score (referred to as the first score) of targeting criteria may be adjusted. For example, in one embodiment consistent with the present invention:

second_TC_score=

(1+multiplier)*first_TC_relevancy_score.

where the multiplier may be determined as follows:

multiplier=LOG(1+cpc)*(⅔)+

LOG(1+number_of_adgroups)*(⅓)

where the cpc is the normalized cpc (i.e., cpc=actual_cpc_of_radlink/average_cpc_across_all_criteria), the number_of_adgroups is the normalized number_of_adgroups (i.e., number_of_adgroups=actual_number_of_adgroups_per_radlink/average_number_of_adgroups_across_all_radlinks), LOG=natural Logarithm, cpc=cost per click, and number_of_adgroups=number of groups of ads per criteria.

The foregoing multiplier formula weighs the cpc twice as much as the number of ad groups per criteria if cpc and number_of_adgroups have roughly the same range. This has the effect of considering relevancy highly and influencing it to favor criteria for which there exist monetizeable ads. Any related ad links that do not have ads associated with them may be eliminated. Some embodiments may set the minimum required number of ads to a predetermined value (e.g., at 2). Naturally, other techniques for rescoring targeting criteria may be used.

As discussed above with reference to operations 980, similar (e.g., duplicate or near duplicate) targeting criteria may be eliminated. Recall that the targeting criteria (TC) may be words or phrases. In at least one exemplary embodiment, consistent with the present invention, such duplicate elimination may be accomplished by (i) sorting the words of each TC, (ii) for a pair of TCs under consideration, for each word of one TC determine, for each word of the other TC, whether the words (or a root thereof) match or not, (iii) determine a ratio of the number of matches to the total number of words in the TCs under consideration, and (iv) apply the determined ratio to a threshold to determine whether or not the TCs are similar. Naturally other duplicate or near duplicate elimination techniques may be used.

Although the foregoing example operated on the basis of ad groups, it may operate on the basis of individual ads.

The determination of whether or not to provide related ad links may consider whether concepts of the document are vague and general, or more specific. For example, if the concepts of the document are vague and very general, it may be desirable to favor the serving of related ad links over ads, or at least increase the likelihood of serving related ad links (e.g., in place of ads). Suppose, for example, "Ford Mustang" is a concept of the document. Rather than serving a lot of individual ads for car dealers for this general concept, it may be more desirable to serve, in place of at least one of the ads, a set of four (4) related ad links for "Buying Ford Mustang", "Aftermarket accessories from Ford for Mustang", "Performance Upgrades" and "Traffic Ticket Lawyers". Conversely, if the concepts of the document are specific, it may be more desirable to favor the serving of ads over set(s) of related ad links, or at least increase the likelihood of serving ads. Suppose, for example, that the concept of the document is "Laser Pointer". In this instance, it may desirable to have just ads for individual products. As an exemplary heuristic for determining when to provide sets of RadLinks or ads, if the concept is vague but has several nearby clearer concepts, then it may be desirable to providing a set of RadLinks for those concepts, rather than ads for the vague concept. Such a heuristic, or other means for such determinations, may be adjusted using statistical data. Such adjustments using statistical data may be particularly useful for documents having concepts that are neither particularly general or vague, nor particularly specific.

Although some of the foregoing examples discussed serving a set of RadLinks instead of an ad, note that the ad may be provided on one or more related ad documents linked from the original document, rather than on the original document. Techniques such as those discussed above may be used to determine if an ad should be rendered by itself, or if it should get lumped into a document linked from a RadLink (referred to as "covered by" a RadLink). For example, consider the case where there is room for three links. The present invention may be used to determine whether show (a) three ads, (b) two ads and one set of RadLinks (perhaps with the third ad covered by the set of RadLinks), (c) one ad, and two sets of RadLinks (perhaps with the second and third ads covered by one or more of the two sets of RadLinks, or (d) no ads and three sets of RadLinks (perhaps with the three ads covered by one or more of the three sets of RadLinks). It is also possible to modifying the ad-RadLink set layout (e.g., to make the RadLink larger). The performance of various different combinations (suggested by different heuristics) may be measured, and heuristic used may be adjusted accordingly.

Alternatives to Radlinks

Rather than links to documents or pages, each having one or more ads, other content may be rendered instead. For example, pay per impression ads without a linked Website may be rendered. As another example, "select to dial" cell phone ads may be rendered instead. Whether or not to serve such alternative content may be determined in a similar manner as radlinks.

Appearance of Set of Related Ads Links

The set related ads links may be presented separate from the source page content (e.g., in a box). They may include an appropriate heading such as "Top Searches," "Hot Searches," "Related Searches," "Related Offers," "{Topic} Offers," etc. "Top Searches" may include links (e.g., on home pages and category specific pages) that provide users with the most popular terms that actual users are searching for. "Related searches" may include links to related terms using a query entered by a user. For example, if the user types in "baby carriages," a related term may be "baby strollers." "Related Offers" may include links to terms that are related to the topic or category of the page. For example a page about cycling may include links for "mountain bicycles," "tandem bicycles" and other links that are related to "cycling." These terms should be highly monetized terms (e.g., terms that always generate at least a particular number of ads or terms that generate ads above a particular revenue per thousand impressions (RPM) (or cost per thousand impressions (CPM)) threshold). The revenue may relate to how much money or compensation the ad server or related ad server will make. The cost may relate to how much money or compensation the advertiser will pay. Thus, advertisements or links may be ranked using a revenue metric, perhaps subject to one or more conditions such as a minimum quality metric.

The Appearance of the Linked Document(s)

The linked documents may simply include a list of one or more ads, such as shown in FIG. 10*b*. Alternative ways to present the linked document(s) are possible. For example, if a RadLink is selected, some or all of the "document" could be re-rendered (perhaps subject to content owner permission) with other ad links inside the document that the user is currently viewing. For example, if there were a total of three (3) RadLinks, selecting one could display a list of five (5) ads, and this list could fill or expand the area set aside for the ad(s) and/or set(s) of RadLinks in the original document.

How to Determine Ads to be Included in the Linked Document

The ads to be included in the linked document (also referred to as "membership") may be determined in various ways under various embodiments of the present invention. For example, membership can be search based. In this case, ads relevant to the original page that could not be served on or with the original page (e.g., too many other ads, wrong format, etc.) may be included in the linked document. Ads already served on the original referring page might be excluded. Alternatively, or in addition, membership can be concept or topic based. Alternatively, or in addition, the linked document may be a search results page (e.g., with expanded snippets) and membership can use targeting keywords of the ads. Alternatively, or in addition, membership can be based on semantic correlation. (See, e.g., U.S. patent application Ser. No. 10/419,692 (incorporated herein by referenced), titled "DETERMINING CONTEXTUAL INFORMATION FOR ADVERTISEMENTS AND USING SUCH DETERMINED CONTEXTUAL INFORMATION TO SUGGEST TARGETING CRITERIA AND/OR IN THE SERVING OF ADVERTISEMENTS," filed on Apr. 21, 2003 and listing Amit Singhal, Mehran Sahami, Amit Patel and Steve Lawrence as inventors.) Membership might include ads that would otherwise be excluded if shown on the source page (e.g., due to competitive issues).

The related ad links can link with documents (e.g., Web pages) having ads using richer media (e.g., audio, image, video, animation, etc.) and/or a larger footprint than ads that may be shown on the source document. For example, the ads could be of a small (e.g., four line), text only, format, or expanded to have larger creatives and even graphics. The linked page including the additional ads could also include other useful information. The linked page may be displayable in the place of the set of RadLinks for example.

Although it was described above that each of the links, when selected, causes the presentation of a document with at least one advertisement relevant to the selected link, it is possible, though very unlikely, that the document may include no ads. Although such a scenario may not be very useful, it may be difficult to avoid altogether.

Content Owner Control

Although some of the foregoing examples discussed serving a set of RadLinks instead Various levels of content owner (e.g., of the source document) control may be provided. For example, the content owner might specify one or more of: (i) a maximum number of related ad links returned; (ii) a footprint or maximum footprint of the set of related ad links; (iii) a maximum number of characters of each related ad link in the set; (iv) whether or not related ad links can be shown with ads, or only by themselves; (v) word or topic filters for the ads on the linked pages; (vi) competitor filters for the ads on the linked pages; (vii) how related ad links are to be determined (e.g., relevance only, monetization only, some mix of factors, etc.); (viii) the level of related ad link duplicate elimination; (ix) whether or not the document with related ads can be displayed on the original document, and/or the size and/or location of such a display, etc.

Account Management

Referring back to FIG. 2, a content server 330 may obtain ads from ad server 310 and RadLinks from related ad link server 360. The ad server 310 and the related ad link server 360 may be (e.g., owned and/or operated by) the same entity. Although the content server 330 may also be the same entity, it will often be a different entity. Advertisers may pay the content server 330 for rendering their ads. For example, content server Websites such as bizrate, nextag, etc. may (i) buy ads from a third party (e.g., Google), and (ii) render its own ads and links, off of which they make money. If the third party internalizes the determination and whether and what ad(s) and/or set(s) of RadLinks to render, and further manages the accounts of the advertisers, this would simplify ad management for the end advertiser. Further, this arrangement could enable higher quality (since the third party is likely an ad network with a lot of useful data). Furthermore, this arrangement could be used to eliminate a middleman and consequently could be more revenue efficient for the paying advertiser. Such an arrangement may be used to relieve the content provider of the burden of managing advertiser accounts.

Thus, at least one exemplary embodiment consistent with the present invention may serve ad(s) and/or set(s) of RadLinks by (a) storing advertiser account information, each account including at least one ad (e.g., a link to a landing page of the advertiser, or a reference to their service or product) and a compensation offer (e.g., price per selection, price per conversion, maximum cost per selection, maximum cost per conversion, etc.), (b) presenting ad(s) and/or set(s) of RadLinks to a user such that the user is presented with ad for an advertiser, and/or a link to a document containing an ad for that advertiser, and (c) recording billable events in the advertiser's account, or billing the advertiser if a billable event occurs.

§4.4 EXAMPLES OF OPERATIONS

Figure 10A:
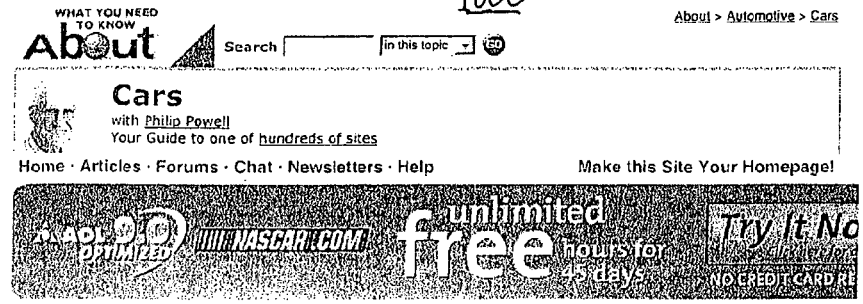
Figure 10A:
Figure 10A:
Figure 10A:

FIGS. 10A and 10B illustrate an exemplary implementation consistent with the principles of the present invention, in which links to related ad Web pages are provided on a general Web page about cars. FIG. 10A illustrates a portion 1000 of a Web page with various content 1010 about cars. Three ads 1020 are provided on the bottom of the Web page portion 1000. Although these ads 1020 concern cars, they are not terribly relevant to the content 1010.

Using the topic or concept "cars," the related ad links serving operations generated a "CARS OFFERS" block 1040 including five "phrase" links—Porsche Boxster, Cadillac CTS, 2003 Cadillac DeVille, Lexus Cars, Chevrolet Cavalier. These phrases may correspond to phrases, having the highest cost-per-click (or even a highest monetization), used by advertisers to target their ads.

Referring to FIG. 10B, if a user selects the first related ad link 1030 corresponding to the phrase "Porsche Boxster," Web page 1050 is provided. As shown, the Web page 1050 includes ads 1060. Note that these ads are targeted to the phrase "Porsche Boxster" and are therefore likely to be relevant to the interest of a user that selected "Porsche Boxster."

As this example illustrates, concept targeted ad might not perform well on documents having more general content. As is also illustrated, the related ad links 1040 has a small footprint, roughly equivalent to the space that would be used by a single text ad. Assuming each of the five related ad links links to a Web page including at least eight (8) results, rather than have one generally targeted text ad shown, at least forty (40) targeted ads are just an extra click away.

§4.5 CONCLUSIONS

As can be appreciated from the foregoing disclosure, the present invention can be used to help advertisers and content owners, or Web page servers, to bring more useful, relevant, and highly monetizable ads to users, even in the case of Web pages with more general content. Thus, the present invention may be used to increase the chances of creating a successful match by listing a wider set of subject areas that display a larger set of ads when clicked. Since home pages and category pages typically concern broad topics (ex. Autos, health, careers) content targeted ads might not provide a match the user's specific interests. Further, such ads might be too large to fit in a prominent place on these pages. Consequently, content targeted ads are frequently not included on these top level (and very high traffic) pages. The present invention provides a bridge between these top level pages and relevant ads.

What is claimed is:
1. A computer-implemented method comprising:
a) accepting, with a computer system including at least one computer, document information of a document;
b) selecting, with the computer system, one or more words or phrases using the accepted document information;

c) generating, with the computer system, a set of links including the selected one or more words or phrases, wherein each of the links, when selected, causes the presentation of another document with at least one advertisement;

d) sending, with the computer system, the set of links to a client device on which the document is being rendered to induce rendering of the set of links on the client device; and e) accepting a parameter that indicates a level of aggressiveness of related ad link duplicate filtering.

2. The computer-implemented method of claim 1 wherein the document information is document relevance information.

3. The computer-implemented method of claim 2 wherein the act of selecting one or more words or phrases includes
   1) determining a set of ads using the document relevance information, and
   2) determining keyword and phrase targeting criteria previously associated with the ads of the set of ads.

4. The computer-implemented method of claim 3 wherein the act of selecting one or more words or phrases further includes
   3) scoring each of the targeting criteria using at least one of (A) relevance of the targeting criteria to content of the document, (B) number of ads associated with the targeting criteria, (C) offer information related to the targeting criteria, (D) revenue information related to the targeting criteria, (E) the number of ads related to the targeting criteria, (F) performance of the ads related to the targeting criteria, and (G) an estimated compensation for the targeting criteria.

5. The computer-implemented method of claim 1 wherein the document information is at least one topic or concept of content of the document.

6. The computer-implemented method of claim 5 wherein the act of selecting one or more words or phrases includes
   1) determining a set of ads using the topic or concept, and
   2) determining keyword and phrase targeting criteria previously associated with the ads of the set of ads.

7. The computer-implemented method of claim 6 wherein the act of selecting one or more words or phrases further includes
   3) scoring each of the targeting criteria using at least one of (A) relevance of the targeting criteria to content of the document, (B) number of ads associated with the targeting criteria, (C) offer information related to the targeting criteria, (D) revenue information related to the targeting criteria, (E) the number of ads related to the targeting criteria, (F) performance of the ads related to the targeting criteria, and (G) an estimated compensation for the targeting criteria.

8. The computer-implemented method of claim 1 further comprising:
   accepting a requested number of links,
      wherein the set of links complies with the accepted requested number.

9. The computer-implemented method of claim 1 further comprising:
   accepting a requested character limit on each link,
      wherein each link of the set of links complies with the accepted requested character limit.

10. The computer-implemented method of claim 1 wherein the set of links is encoded as a JavaScript array.

11. The computer-implemented method of claim 1 wherein the set of links is encoded using extensible markup language.

12. The computer-implemented method of claim 1 further comprising accepting a requested maximum footprint of the set of related ad links,
   wherein the set of links is encoded so that it is rendered in compliance with the requested maximum footprint.

13. The computer-implemented method of claim 1 further comprising accepting requested rules for determining links,
   wherein the act of generating a set of links including the selected one or more words or phrases uses the rules for determining links.

14. The computer-implemented method of claim 13 wherein the requested rules include a rule that the links must be relevant to the content of the document.

15. The computer-implemented method of claim 13 wherein the requested rules include a rule that the links must be selected to maximize monetization.

16. The computer-implemented method of claim 13 wherein the requested rules include a rule that the links must be selected to maximize a score determined using relevance of the link to the content of the document and estimated monetization of the link.

17. A computer-implemented method comprising:
   a) accepting, with a computer system including at least one computer, document information of a document;
   b) generating, with the computer system, a set of links using the document information, wherein each of the links, when selected, causes the presentation of another document with at least one advertisement;
   c) determining, with the computer system, whether to render one of (A) an ad and (B) the generated set of links, with the document; and
   d) rendering, with a client device, one of (A) the ad and (B) the generated set of links, with the document based on the determination.

18. The computer-implemented method of claim 17 wherein the act of determining whether to render one of (A) an ad and (B) the generated set of links with the document includes determining an expected value of both the ad and the generated set of links.

19. The computer-implemented method of claim 17 wherein the act of determining whether to render one of (A) an ad and (B) the generated set of links with the document includes determining whether the ad is targeted to a more general concept or a more specific concept.

20. The computer-implemented method of claim 17 further comprising:
   e) accepting, with the client device, a user selection of a link of the generated set of links; and
   f) re-rendering, with the client device, at least a portion of the document to include one or more ads associated with the selected link, wherein the other document corresponds to the re-rendered document.

21. Apparatus comprising:
   a) at least one processor; and
   b) at least one storage device storing instructions which, when executed by the at least one processor, performs a method including,
      1) accepting document information of a document,
      2) generating a set of links using the document information, wherein each of the links, when selected, causes the presentation of another document with at least one advertisement,
      3) determining whether to render one of (A) an ad and (B) the generated set of links, with the document, and
      4) rendering one of (A) the ad and (B) the generated set of links, with the document based on the determination.

22. The apparatus of claim 21 wherein the act of determining whether to render one of (A) an ad and (B) the generated set of links with the document includes determining an expected value of both the ad and the generated set of links.

23. The apparatus of claim 21 wherein the act of determining whether to render one of (A) an ad and (B) the generated set of links with the document includes determining whether the ad is targeted to a more general concept or a more specific concept.

24. The apparatus of claim 21 wherein the act of determining whether to render one of (A) an ad and (B) the generated set of links with the document includes determining whether the ad can be included in a second document linked from the set of links.

25. The apparatus of claim 21 wherein the method further includes
  5) accepting a user selection of a link of the generated set of links, and
  6) re-rendering at least a portion of the document to include one or more ads associated with the selected link.

26. The computer-implemented method of claim 17 wherein the act of determining whether to render one of (A) an ad and (B) the generated set of links with the document includes determining whether the ad can be included in a second document linked from the set of links.

\* \* \* \* \*